US010482042B2

(12) United States Patent
Yoon

(10) Patent No.: US 10,482,042 B2
(45) Date of Patent: *Nov. 19, 2019

(54) MULTI-PROCESSOR SYSTEM INCLUDING MEMORY SHARED BY MULTI-PROCESSOR AND METHOD THEREOF

(71) Applicant: Samsung Electronics Co., Ltd., Suwon-si, Gyeonggi-do (KR)

(72) Inventor: Ji Yong Yoon, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/213,233

(22) Filed: Dec. 7, 2018

(65) Prior Publication Data
US 2019/0108146 A1 Apr. 11, 2019

Related U.S. Application Data

(63) Continuation of application No. 15/344,881, filed on Nov. 7, 2016, now Pat. No. 10,185,673.

(30) Foreign Application Priority Data

Nov. 12, 2015 (KR) .................... 10-2015-0158904

(51) Int. Cl.
*G06F 13/16* (2006.01)
*G06F 12/0813* (2016.01)
(Continued)

(52) U.S. Cl.
CPC ...... *G06F 13/1668* (2013.01); *G06F 12/0813* (2013.01); *G06F 12/0866* (2013.01);
(Continued)

(58) Field of Classification Search
CPC ............ G06F 12/1081; G06F 12/0284; G06F 12/0813; G06F 13/1663; G06F 13/1668;
(Continued)

(56) References Cited

U.S. PATENT DOCUMENTS 6,381,682 B2 4/2002 Noel et al.
6,987,961 B1 1/2006 Pothana
(Continued)

FOREIGN PATENT DOCUMENTS

JP H06-12363 A 1/1994
JP 2006293836 A 10/2006
(Continued)

*Primary Examiner* — Thomas J Cleary
(74) *Attorney, Agent, or Firm* — Harness, Dickey & Pierce, P.L.C.

(57) ABSTRACT

A multi-processor system includes a first processor; a second processor; a common memory configured to store data generated by the first processor and data generated by the second processor; and a memory interface circuit configured to interface between the common memory and the first and second processors, the first processor being configured to demodulate and decode a signal received through wireless communication, and store the decoded data in the common memory via the memory interface circuit, the memory interface circuit being configured to read and decipher the decoded data stored in the common memory, and store the deciphered data in the common memory.

18 Claims, 12 Drawing Sheets

(51) Int. Cl.
*G06F 13/24* (2006.01)
*G06F 13/28* (2006.01)
*G06F 13/40* (2006.01)
*G06F 12/0866* (2016.01)
*H04W 4/60* (2018.01)

(52) U.S. Cl.
CPC .......... *G06F 13/1663* (2013.01); *G06F 13/24* (2013.01); *G06F 13/28* (2013.01); *G06F 13/4068* (2013.01); *G06F 2212/154* (2013.01); *G06F 2212/60* (2013.01); *G06F 2212/62* (2013.01); *H04W 4/60* (2018.02); *Y02D 10/13* (2018.01); *Y02D 10/14* (2018.01); *Y02D 10/151* (2018.01)

(58) Field of Classification Search
CPC ...... G06F 13/24; G06F 13/28; G06F 13/4068; G06F 15/163; G06F 15/167; G06F 21/00; G06F 21/60; G06F 21/602; G06F 21/606; G06F 2212/60; G06F 2212/62; G06F 2212/154; Y02D 10/13; Y02D 10/14; Y02D 10/151; H04W 4/60
See application file for complete search history.

(56) References Cited

U.S. PATENT DOCUMENTS

| | | | |
|---|---|---|---|
| 7,080,215 | B2 | 7/2006 | Ueno |
| 7,114,042 | B2 | 9/2006 | Day et al. |
| 8,001,294 | B2 | 8/2011 | Inoue et al. |
| 8,588,253 | B2 | 11/2013 | Dyck et al. |
| 8,635,412 | B1 | 1/2014 | Wilshire |
| 9,311,458 | B2 | 4/2016 | Mangalampalli et al. |
| 10,185,673 | B2 * | 1/2019 | Yoon ................... G06F 12/0813 |
| 2005/0066067 | A1 | 3/2005 | Suh |
| 2006/0106988 | A1 | 5/2006 | Khawand et al. |
| 2007/0033348 | A1 | 2/2007 | Oh |
| 2008/0162784 | A1 | 7/2008 | Obereiner et al. |
| 2010/0106917 | A1 | 4/2010 | Ruberg et al. |
| 2010/0216506 | A1 | 8/2010 | Chang et al. |
| 2010/0322419 | A1 | 12/2010 | Takeuchi et al. |
| 2014/0004829 | A1 | 1/2014 | Rieger et al. |
| 2014/0165078 | A1 | 6/2014 | Kim |
| 2016/0357248 | A1 | 12/2016 | Lingutla et al. |
| 2017/0337966 | A1 | 11/2017 | Kim et al. |

FOREIGN PATENT DOCUMENTS

| | | |
|---|---|---|
| JP | 2007041768 A | 2/2007 |
| JP | 2008090455 A | 4/2008 |

* cited by examiner

MULTI-PROCESSOR SYSTEM INCLUDING MEMORY SHARED BY MULTI-PROCESSOR AND METHOD THEREOF

CROSS-REFERENCE TO RELATED APPLICATION

This application is a continuation of and claims priority under 35 U.S.C. §§ 120/121 to U.S. patent application Ser. No. 15/344,881, filed on Nov. 7, 2016, which claims the benefit of Korean Patent Application No. 10-2015-0158904 filed on Nov. 12, 2015, in the Korean Intellectual Property Office, the disclosures of each of which are hereby incorporated by reference in their entirety.

BACKGROUND

One or more example embodiments of the inventive concepts relate to a system including one or more processors and a method of operating the same, and more particularly, to a multi-processor system including different types of processors and a method of operating the same.

In a mobile device according to the related art (e.g., a smart phone, a tablet personal computer (PC), etc.), an application processor (AP) and a connectivity processor (CP) are embodied as different chips and connected to each other through a chip-to-chip interface. The AP is a main chip of the mobile device which drives an operating system (OS) of the mobile device and various application programs. The CP connects the mobile device to an external device and may be also referred to as a communication chip.

Thus, in the related art, the CP and the AP operate separately as independent systems and exchange data with each other through the chip-to-chip interface.

Recently, a method in which an AP and a CP are combined together as one system-on-chip (SoC) has been introduced.

SUMMARY

According to at least some example embodiments, a multi-processor system includes a first processor; a second processor; a common memory configured to store data generated by the first processor and data generated by the second processor; and a memory interface circuit configured to interface between the common memory and the first and second processors, the first processor being configured to demodulate and decode a signal received through wireless communication, and store the decoded data in the common memory via the memory interface circuit, the memory interface circuit being configured to read and decipher the decoded data stored in the common memory, and store the deciphered data in the common memory.

The common memory may include a first-processor allocation region and a second-processor allocation region, and the memory interface circuit may be configured to store the decoded data in the first-processor allocation region, and store the deciphered data in the second-processor allocation region.

The memory interface circuit may include a memory controller configured to access the common memory according to a first memory access request from a first direct memory access (DMA) unit of the first processor and a second memory access request from a second DMA unit of the second processor; and a local bus configured to, receive the first memory access request and the second memory access request, and transmit the first memory access request and the second memory access request to the memory controller.

The memory controller may include a local DMA unit; and a cipher and decipher module configured to request the local DMA unit to read the decoded data stored in the first-processor allocation region, and decipher the decoded data read via the local DMA unit, the local DMA unit being configured to, read the decoded data stored in the first-processor allocation region, and provide the decoded data to the cipher and decipher module, according to the request from the cipher and decipher module.

The first processor may be configured to generate a first address descriptor and store the first address descriptor in the first-processor allocation region, the local DMA unit may be configured to read the decoded data by referring to the first address descriptor stored in the first-processor allocation region, and the first address descriptor may include address information of the decoded data.

The second processor may be configured to generate a second address descriptor and store the second address descriptor in the second-processor allocation region, the local DMA unit may be configured to store the deciphered data in the second-processor allocation region by referring to the second address descriptor stored in the second-processor allocation region, according to the request from the cipher and decipher module, and the second address descriptor may include address information of the deciphered data.

The local DMA unit may be configured to inform a mailbox of an end of the storing of the deciphered data, after the storing of the deciphered data in the second-processor allocation region, and the mailbox may be configured to provide an interrupt signal to the second processor.

The second processor may be configured to issue the second memory access request of requesting the memory interface circuit to provide the deciphered data in response to the interrupt signal provided by the mailbox, the memory interface circuit may be configured to read the deciphered data from the second-processor allocation region by referring to the second address descriptor, the memory interface circuit may be configured to transmit the deciphered data to the second processor, according to the second memory access request, and the second processor may be configured to receive the deciphered data from the memory interface circuit and process the deciphered data.

The memory interface circuit may further include a system cache configured to store some of the data stored in the common memory, the memory interface circuit being configured to determine whether requested information is cached in the system cache before obtaining the requested information from the common memory.

The memory interface circuit may include a cipher and decipher module configured to generate deciphered data by deciphering the decoded data; and a local DMA unit connected to the local bus, the local DMA unit being configured to request the local bus to provide the deciphered data according to a request from the cipher and decipher module, the local bus being configured to transmit a signal requesting the deciphered data received from the local DMA unit to the memory controller.

The first processor may be configured to generate a first address descriptor and store the first address descriptor in the first-processor allocation region, the local DMA unit may be configured to read the decoded data by referring to the first address descriptor stored in the first-processor allocation region, and the first address descriptor may include address information of the decoded data.

The first processor may be configured to generate a second address descriptor and store the second address descriptor in the second-processor allocation region, the local DMA unit may be configured to store the deciphered data in the second-processor allocation region by referring to the second address descriptor stored in the second-processor allocation region, according to a request from the cipher and decipher module, and the second address descriptor includes address information of the deciphered data.

The memory interface circuit may further include a system cache configured to store some of the data stored in the common memory, the memory interface circuit being configured to determine whether requested information is cached in the system cache before obtaining the requested information from the common memory.

The first processor may be a connectivity processor (CP), and the second processor may be an application processor (AP).

According to at least some example embodiments of the inventive concepts, a multi-processor system includes a first processor; a second processor; a common memory configured to store data generated by the first processor and data generated by the second processor; and a memory interface circuit configured to interface between the common memory and the first and second processors, the second processor being configured to generate uplink data for wireless communication and store the uplink data in the common memory via the memory interface circuit, the memory interface circuit being further configured to read and cipher the uplink data stored in the common memory, and store the ciphered data in the common memory.

The common memory may include a first-processor allocation region and a second-processor allocation region, the memory interface circuit may be configured to store the uplink data in the second-processor allocation region, and the memory interface circuit may be configured to store the ciphered data in the first-processor allocation region.

The first processor may be configured to send a request for the ciphered data to memory interface circuit, and the memory interface circuit may be configured to respond to the request by, reading the ciphered data from the common memory, and providing the read ciphered data to the first processor.

The first processor may be configured to, receive the read ciphered data from the memory interface circuit, convert the read ciphered data into wireless data, and transmit the wireless data wirelessly.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION OF THE EMBODIMENTS

Figure 1:
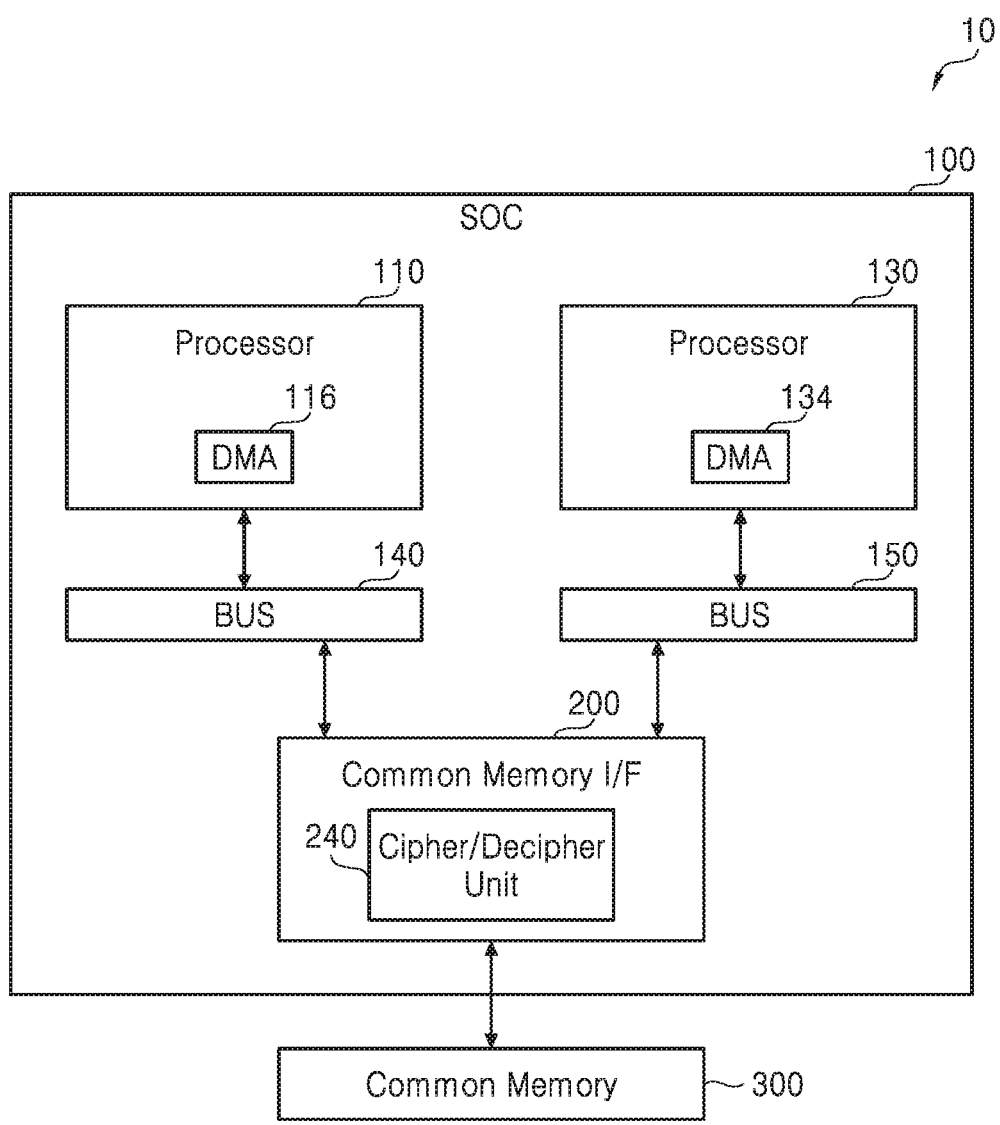
FIG. 1 is a schematic block diagram of a multi-processor system according to at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

FIG. 1 is a schematic block diagram of a multi-processor system 10 according to at least one example embodiment of the inventive concepts. Referring to FIG. 1, the multi-processor system 10 includes a system-on-chip (SoC) 100 and a common memory 300.

The SoC 100 includes a first processor 110, a second processor 130, and a common memory interface circuit 200.

Each of the first and second processors 110 and 130 may access the common memory 300 via the common memory interface circuit 200. That is, the common memory interface circuit 200 may interface between the common memory 300 and the first and second processors 110 and 130. Each of the first and second processors 110 and 130 may include at least one processing unit.

The common memory 300 is a main memory commonly used by the first and second processors 110 and 130. The common memory 300 may be, for example, a dynamic random-access memory (DRAM) but is not limited thereto. For example, the common memory 300 may be embodied as a nonvolatile memory.

The first processor 110 or the second processor 130 may transmit a memory access request, i.e., a data store (write) request or a data read request to the common memory interface circuit 200. For example, the first processor 110 or the second processor 130 may exchange data with the common memory interface circuit 200 via a direct memory access (DMA) unit 116 or a DMA unit 134 thereof.

A first bus 140 located between the first processor 110 and the common memory interface circuit 200 may support exchange of data between the first processor 110 and the common memory interface circuit 200.

A second bus 150 located between the second processor 130 and the common memory interface circuit 200 may support exchange of data between the second processor 130 and the common memory interface circuit 200.

In one embodiment, each of the first and second buses 140 and 150 may be a bus according to the Advanced Microcontroller Bus architecture (AMBA) or the Advanced eXtensible Interface (AXI) specification. However, the first and second buses 140 and 150 are not limited to the above-referenced specifications and may be a bus according to another interconnect specification.

The first processor 110 may demodulate and decode a signal received through wireless communication to obtain decoded data, and store the decoded data in the common memory 300 via the common memory interface circuit 200. The decoded data may be ciphered (or encrypted) data. In one embodiment, the first processor 110 may generate packet data that has a predetermined or, alternatively, desired format and includes the decoded data (e.g., Internet protocol (IP) packet data). In this case, the packet data including the decoded data may be stored in the common memory 300.

The common memory interface circuit 200 reads and deciphers the decoded data stored in the common memory 300, and stores the deciphered data in the common memory 300.

To this end, the common memory interface circuit 200 includes a cipher/decipher module 240 to decipher the decoded data. The cipher/decipher module 240 may be embodied by circuitry included in the common memory interface circuit 200.

After the deciphered data is stored in the common memory 300 by the common memory interface circuit 200, the second processor 130 reads the deciphered data from the common memory 300 and processes the deciphered data.

Figure 2:
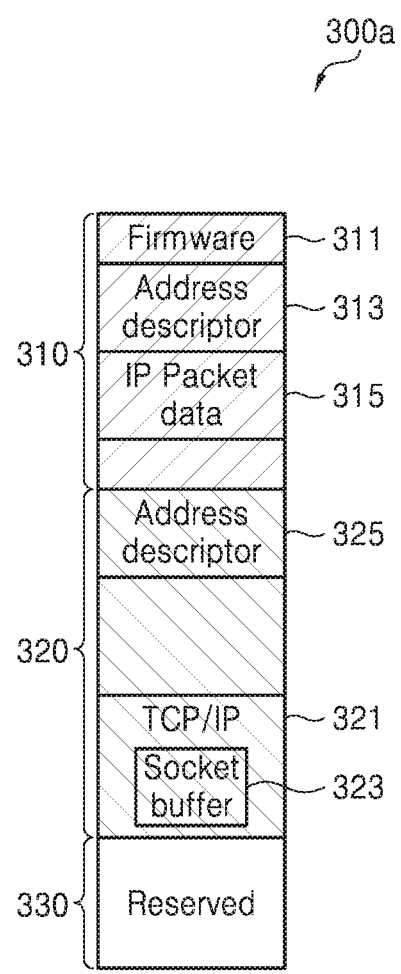
FIG. 2 is a diagram illustrating a structure of a common memory of FIG. 1 according to at least one example embodiment of the inventive concepts.

FIG. 2 is a diagram illustrating a common memory 300a, such as that of FIG. 1, according to at least one example embodiment of the inventive concepts. Referring to FIGS. 1 and 2, the common memory 300a may be divided into a plurality of regions, e.g., two or more regions. In one embodiment, the common memory 300a may be divided into a first-processor allocation region 310, a second-processor allocation region 320, and a reserved region 330.

The first-processor allocation region 310 may include a firmware region 311, an address descriptor region 313, and a packet data region 315.

The firmware region 311 is a region for storing firmware of the first processor 110. The address descriptor region 313 may be a region for storing an address descriptor generated by the first processor 110. The address descriptor generated by the first processor 110 may include address information designating a location at which data, which is to be used (stored or read) by the first processor 110, will be stored.

The packet data region 315 is a region for storing data for the first processor 110. For example, packet data generated by or to be read by the first processor 110 may be stored in the packet data region 315.

Data decoded by the first processor 110 may be stored in the packet data region 315 according to the address descriptor stored in the address descriptor region 313.

The second-processor allocation region 320 may include a TCP/IP data region 321 and an address descriptor region 325.

The TCP/IP data region 321 is a region for storing data for the second processor 130. For example, packet data generated by or to be read by the second processor 130 may be stored in the TCP/IP data region 321.

The TCP/IP data region 321 may include a socket buffer 323.

The address descriptor region 325 may be a region for storing an address descriptor generated by the second processor 130. The address descriptor generated by the second processor 130 may include address information designating a location at which data, which is to be used (stored or read) by the second processor 130, will be stored.

Data deciphered by the common memory interface circuit 200 may be stored in the socket buffer 323 according to the address descriptor stored in the address descriptor region 325.

Figure 3:
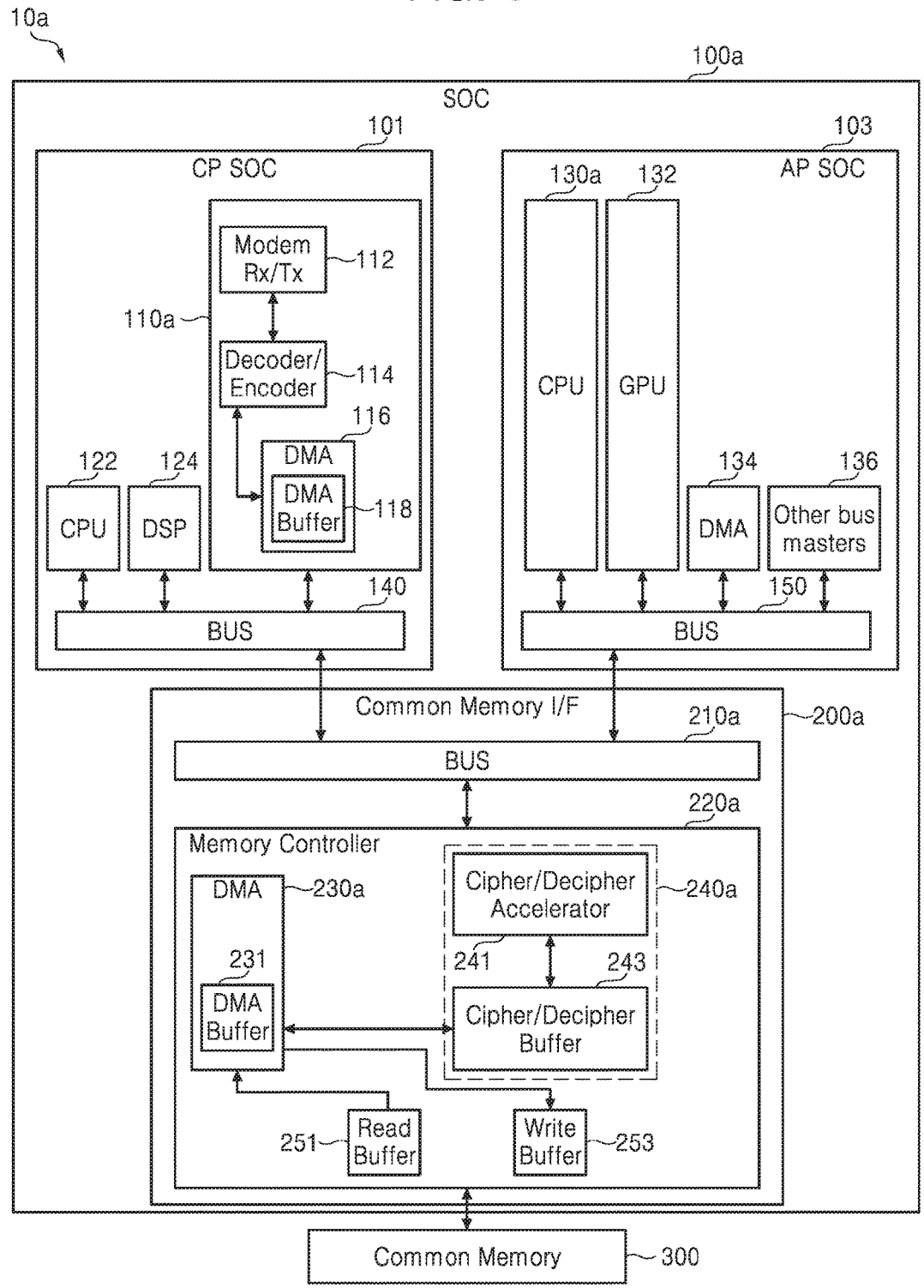
FIG. 3 is a diagram illustrating in detail a multi-processor system according to at least one example embodiment of the inventive concepts.

FIG. 3 is a diagram more particularly illustrating a multi-processor system 10a according to at least one example embodiment of the inventive concepts. Referring to FIG. 3, the multi-processor system 10a includes a system-on-chip (SoC) 100a and a common memory 300.

The SoC 100a includes a connectivity processor (CP) SoC 101, an application processor (AP) SoC 103, and a common memory interface circuit 200.

The CP SoC 101 may include a modem processor 110a, a central processing unit (CPU) 122, a digital signal processor (DSP) 124, and a first bus 140.

The CPU 122 controls overall operations of the CP SoC 101.

The modem processor 110a may include a modulator/demodulator (modem Rx/Tx) 112, an encoder/decoder 114, and a first DMA unit 116. The modem processor 110a may correspond to the first processor 110 of FIG. 1. As illustrated in FIG. 3, the modem processor 110a may be embodied as one SoC (i.e., the CP SoC 101) together with another processor and/or a device but is not limited to this example. According to at least some example embodiments of the inventive concepts, the term "DMA unit" as used in the present disclosure may refer to, for example, a DMA controller.

The modulator/demodulator (modem Rx/Tx) 112 may demodulate data received through wireless communication (e.g., downlink data), and modulate data to be transmitted through wireless communication (e.g., uplink data).

Here, the downlink data may be comprehensively understood as data to be processed by being transmitted from a mobile communication base station to a mobile device, and the uplink data may be comprehensively understood as data generated by the mobile device and transmitted to the mobile communication base station.

The multi-processor systems 10, 10a, and 10b according to at least some example embodiments of the inventive concepts are applicable to mobile devices for mobile communication. A modulation/demodulation method to be employed by the modulator/demodulator (modem Rx/Tx) 112 may vary according to a wireless communication protocol.

In the case of the downlink data, the encoder/decoder 114 may receive and decode data modulated by the modulator/demodulator (modem Rx/Tx) 112. In the case of the uplink data, the encoder/decoder 114 may encode data and transmit the encoded data to the modulator/demodulator (modem Rx/Tx) 112. In this case, the modulator/demodulator (modem Rx/Tx) 112 may modulate the encoded data into wireless data to be transmitted through wireless communication.

In one embodiment, the encoded data may be data cyphered by a common memory interface circuit 200a. Thus, the modem processor 110a may convert the cyphered data into wireless data to be transmitted through wireless communication.

The DSP 124 may perform various processing operations on a digital signal.

For example, the DSP 124 may process image data received from an image sensor (not shown).

The first bus 140 supports communication between elements included in the CP SoC 101, and communication between the CP SoC 101 and an external device.

The common memory interface circuit 200a may include a local bus 210a and a memory controller 220a.

The local bus 210a may be connected to the first bus 140 and the second bus 150.

For example, the local bus 210a may support exchange of data between the first processor 110 and the memory controller 220a together with the first bus 140, and support exchange of data between the second processor 130 and the memory controller 220a together with the second bus 150. As is discussed in greater detail below, the CPU 130a of FIG. 3 may be an example of the second processor 130 of FIG. 1.

The memory controller 220a may include a local DMA unit 230a, a cipher/decipher module 240a, a read buffer 251, and a write buffer 253.

The memory controller 220a may receive decoded data from the first DMA unit 116 via the first bus 140 and the local bus 210a, and temporarily store the decoded data in the write buffer 253. The memory controller 220a may store the decoded data, which is stored in the write buffer 253, in the common memory 300.

For example, the memory controller 220a may store the decoded data in the packet data region 315 of the first-processor allocation region 310 of the common memory 300.

The write buffer 253 is a buffer configured to temporarily store data to be stored in the common memory 300.

The cipher/decipher module 240a may request the local DMA unit 230a to read the decoded data stored in the common memory 300. The local DMA unit 230a reads the decoded data from the common memory 300 and provides the read data to the cipher/decipher module 240a, according to the request. In one embodiment, the local DMA unit 230a may detect address information of the decoded data by referring to a first address descriptor, and read the decoded data according to the address information.

Information for referring to the first address descriptor may be included in an instruction issued from the first processor 110. For example, the first processor 110 may issue the instruction including the information for referring to the first address descriptor to the local DMA unit 230a. Otherwise, the first processor 110 may set the information for referring to the first address descriptor in a register (e.g., a special function register) (not shown) included in the local DMA unit 230a.

The decoded data read from the common memory 300 may be temporarily stored in the read buffer 251.

The read buffer 253 is a buffer configured to temporarily store data read from the common memory 300.

The cipher/decipher module 240a generates deciphered data by deciphering the decoded data received via the local DMA unit 230a. In one embodiment, the cipher/decipher module 240a may include a cipher/decipher accelerator 241 and a cipher/decipher buffer 243. The cipher/decipher accelerator 241 may be embodied as a circuit or circuits for ciphering non-ciphered data and deciphering ciphered data (e.g., decoded data). Alternatively, the cipher/decipher accelerator 241 may be embodied as a processor that executes a program which includes instructions that, when executed by the processor, cause the processor to cipher non-cyphered data and decipher ciphered data (e.g., decoded data). The cipher/decipher buffer 243 may temporarily store input data and/or output data of the cipher/decipher accelerator 241.

The cipher/decipher module 240a may request the local DMA unit 230a to store the deciphered data. According to the request, the local DMA unit 230a receives the deciphered data from the cipher/decipher module 240a and stores the deciphered data in the common memory 300 via the write buffer 253.

In one embodiment, the local DMA unit 230a may detect information regarding an address at which the deciphered data is to be stored by referring to a second address descriptor, and store the deciphered data in the common memory 300 according to the information regarding the address.

For example, the local DMA unit 230a may store the deciphered data in the socket buffer 323 of the TCP/IP data region 321 of the second-processor allocation region 320.

Information for referring to the second address descriptor may be included in an instruction issued from the second processor 130 to the local DMA unit 230a. For example, the second processor 130 may issue the information for referring to the second address descriptor to the local DMA unit 230a. Alternatively, the second processor 130 may set the information for referring to the second address descriptor in a register (not shown) included in the local DMA unit 230a.

The AP SoC 103 may include a CPU 130a, a graphics processing unit (GPU) 132, a second DMA unit 134, and the second bus 150.

The CPU 130a controls overall operations of the AP SoC 103.

The CPU 130a may be embodied as, for example, a multi-core processor. The multi-core processor may be one computing component having two or more independent and substantial processing units (which are referred to as 'cores'). Each of the cores may read and execute program instructions.

The CPU 130a may correspond to the second processor 130 of FIG. 1. As illustrated in FIG. 3, the CPU 130a may be embodied as one SoC (i.e., the AP SoC 103) together with another processor and/or a device but is not limited thereto.

The CPU 130a may read and process the deciphered data stored in the common memory 300. Also, the CPU 130a may generate data (e.g., packet data) to be transmitted through wireless communication, and store the generated data in the common memory 300.

The GPU 132 may read and execute program instructions related to graphic processing. For example, the GPU 132 may perform graphics-related processing and the like at a high speed.

The second DMA unit 134 may store data in or read data from the common memory according to a request from the CPU 130a, the GPU 132, or other bus masters 136.

For example, the second DMA unit 134 may read the deciphered data stored in the common memory 300 or store packet data generated by the CPU 130a in the common memory 300, according to a request from the CPU 130a.

Figure 4:
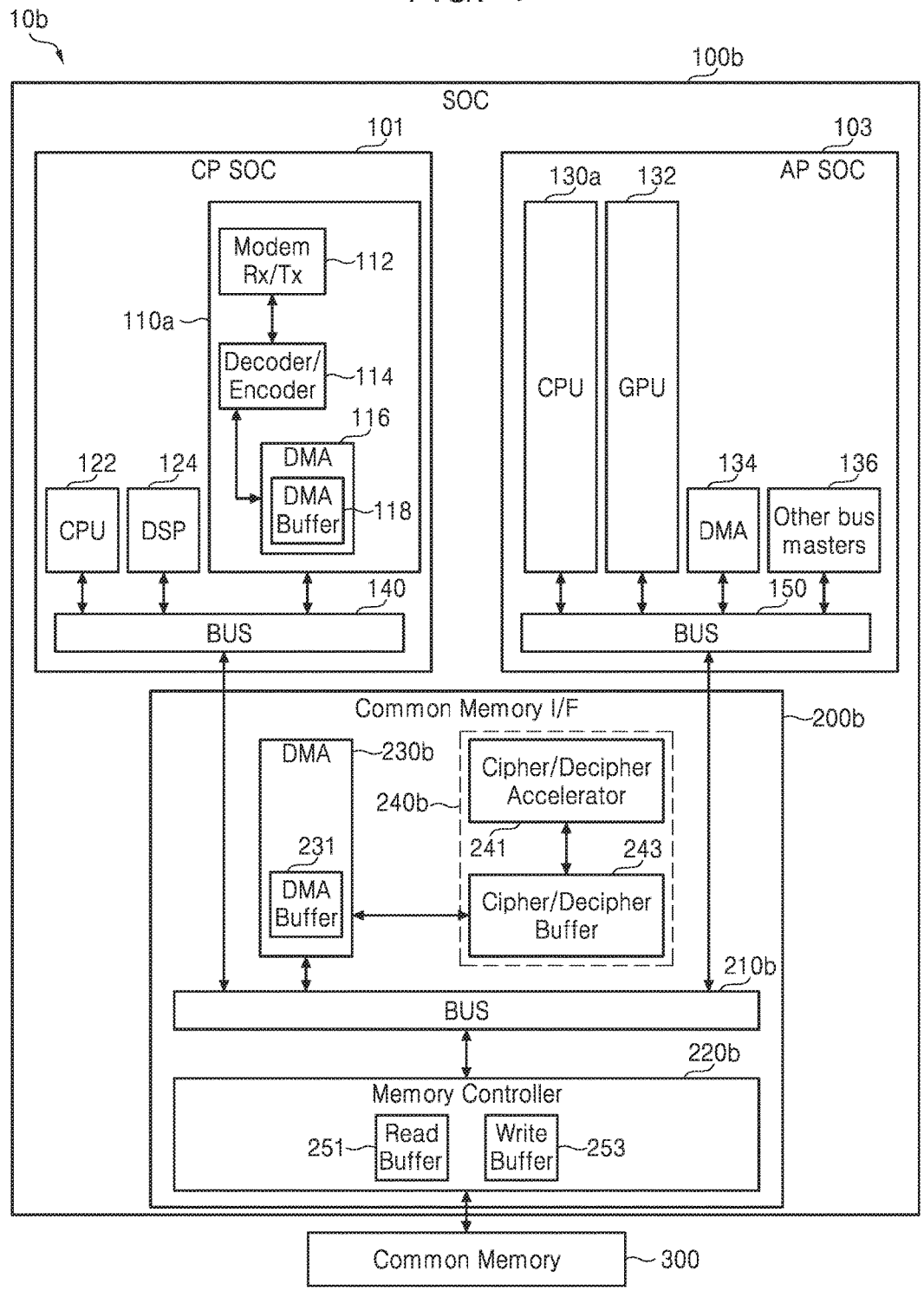
FIG. 4 is a diagram illustrating in detail a multi-processor system according to at least another example embodiment of the inventive concepts.

FIG. 4 is a diagram particularly illustrating a multi-processor system 10b according to at least another example embodiment of the inventive concepts. The multi-processor system 10b of FIG. 4 is substantially the same as the multi-processor system 10a of FIG. 3 in terms of their structures and operations and will be thus described focusing on the differences from the multi-processor system 10a to avoid redundant description.

Referring to FIGS. 3 and 4, the multi-processor system 10b includes a SoC 100b and a common memory 300.

The SoC 100b includes a CP SoC 101, an AP SoC 103, and a common memory interface circuit 200b.

The common memory interface circuit 200b may include a local bus 210b, a memory controller 220b, a local DMA unit 230b, and a cipher/decipher module 240b.

The local DMA unit 230a and the cipher/decipher module 240a are located in the memory controller 220a at a backend of the local bus 210a in the embodiment of FIG. 3, whereas the local DMA unit 230b and the cipher/decipher module 240b are located at a front end of the local bus 210b in the embodiment of FIG. 4.

The local bus 210b may be connected to a first bus 140 and a second bus 150.

For example, the local bus 210b may support exchange of data between the first processor 110 (e.g., the modem processor 110a) and the memory controller 220b together with the first bus 140, and support exchange of data between the second processor 130 (e.g., the CPU 130a) and the memory controller 220b together with the second bus 150.

The memory controller 220b may include a read buffer 251 and a write buffer 253.

The memory controller 220b may receive decoded data from a first DMA unit 116 via the first bus 140 and the local bus 210b, and temporarily store the decoded data in the write buffer 253. The memory controller 220b may store the decoded data, which is stored in the write buffer 253, in the common memory 300.

The cipher/decipher module 240b may request the local DMA unit 230b to read the decoded data stored in the common memory 300. The local DMA unit 230b reads the decoded data from the common memory 300 and provides the decoded data to the cipher/decipher module 240b, according to the request.

In the present embodiment, the decoded data read from the common memory 300 may be temporarily stored in the read buffer 251, stored in a DMA buffer 231 included in the local DMA unit 230b via the local bus 210b, and transmitted and stored in a cypher/decipher buffer 243 included in the cipher/decipher module 240b.

A cipher/decipher accelerator 241 generates deciphered data by deciphering the decoded data stored in the cypher/decipher buffer 243 included in the cipher/decipher module 240b.

The cipher/decipher module 240b may request the local DMA unit 230b to store the deciphered data. The local DMA unit 230b receives the deciphered data from the cipher/ decipher module 240*b* and stores the deciphered data in the common memory 300, according to the request.

In at least one example embodiment, the cipher/decipher accelerator 241 may store the deciphered data in the cypher/decipher buffer 243 included in the cipher/decipher module 240*b*. The deciphered data may be transmitted from the cypher/decipher buffer 243 to the DMA buffer 231 of the local DMA unit 230*b*, stored in the DMA buffer 231, temporarily stored in the write buffer 253 of the memory controller 220*b* via the local bus 210*b*, and then stored in the common memory 300.

As described above, a path of reading decoded data or a path of storing deciphered data may vary according to the positions of the local DMA unit 230*a* and the cipher/decipher module 240*a* included in the common memory interface circuit 200*a* or the local DMA unit 230*b* and the cipher/decipher module 240*b* included in the common memory interface circuit. However, a function and operation of reading decoded data from the common memory 300, deciphering the decoded data, and storing the deciphered data in the common memory 300 by the common memory interface circuit 200*a* are substantially the same as those of reading decoded data from the common memory 300, deciphering the decoded data, and storing the deciphered data in the common memory 300 by the common memory interface circuit 200*b*.

As described above, according to at least one example embodiment of the inventive concepts, the local DMA unit 230*a* or 230*b* and the cipher/decipher module 240*a* or 240*b* are included in the common memory interface circuit 200*a* or 200*b*. Thus, when data is transmitted from the first-processor allocation region 310 of the common memory 300 to the second-processor allocation region 320 thereof or is transmitted from the second-processor allocation region 320 to the first-processor allocation region 310, the data is internally transmitted only via the common memory interface circuit 200 without passing through the buses 140 and 150 of the respective first and second processors 110 and 130. Thus, a number of times the common memory 300 is accessed when data is exchanged between the first processor 110 and the second processor 130 may be reduced.

Accordingly, the performance (e.g., the operating speed, etc.) of a multi-processor system may be improved and power consumption thereof may be decreased.

Figure 5:
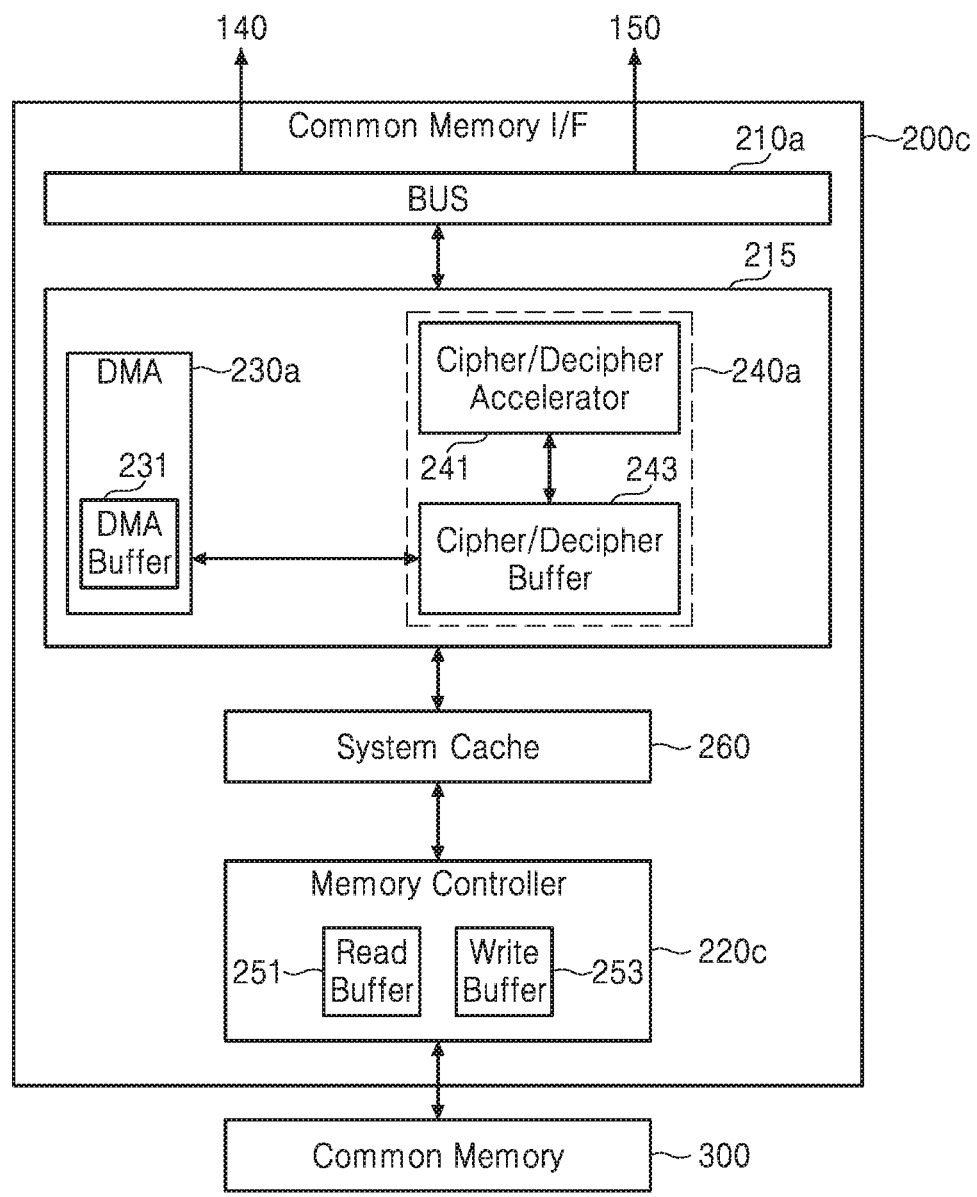
FIG. 5 is a block diagram of a modified example of a memory interface circuit illustrated in FIG. 3.

FIG. 5 is a block diagram of a common memory interface circuit 200*c* which is a modified example of the common memory interface circuit 200*a* illustrated in FIG. 3. Referring to FIGS. 3 and 5, the common memory interface circuit 200*c* is substantially the same as the common memory interface circuit 200*a* of FIG. 3 in terms of their structures and operations, and will be thus described focusing on the differences from the common memory interface circuit 200*a* to avoid redundant description.

The common memory interface circuit 200*c* further includes a system cache 260, compared to the common memory interface circuit 200*a* of FIG. 3.

The system cache 260 may store some of data stored in a common memory 300. Before reading the data from the common memory 300, the common memory interface circuit 200*c* may check whether the data has been stored in the system cache 260.

For example, in order to read decoded data from the common memory 300 according to a request from a cipher/decipher module 240*a*, a local DMA unit 230*a* of the common memory interface circuit 200*c* may first request the system cache 260 to provide the decoded data. In FIG. 5, reference numeral 215 represents a block including the local DMA unit 230*a* and the cipher/decipher module 240*a*.

A scenario in which desired data (e.g., the decoded data) has been stored in the system cache 260 is referred to as a 'cache-hit'. When a cache-hit occurs, the local DMA unit 230*a* may read the decoded data from the system cache 260 and provide the decoded data to the cipher/decipher module 240*a*.

A scenario on which desired data (e.g., the decoded data) is not stored in the system cache 260, is referred to as a 'cache-miss'. When a cache-miss occurs, the local DMA unit 230*a* may read the decoded data from the common memory 300 via a memory controller 220*c* and provide the decoded data to the cipher/decipher module 240*a*. In this case, the decoded data read from the common memory 300 may be stored in the system cache 260.

Figure 6:
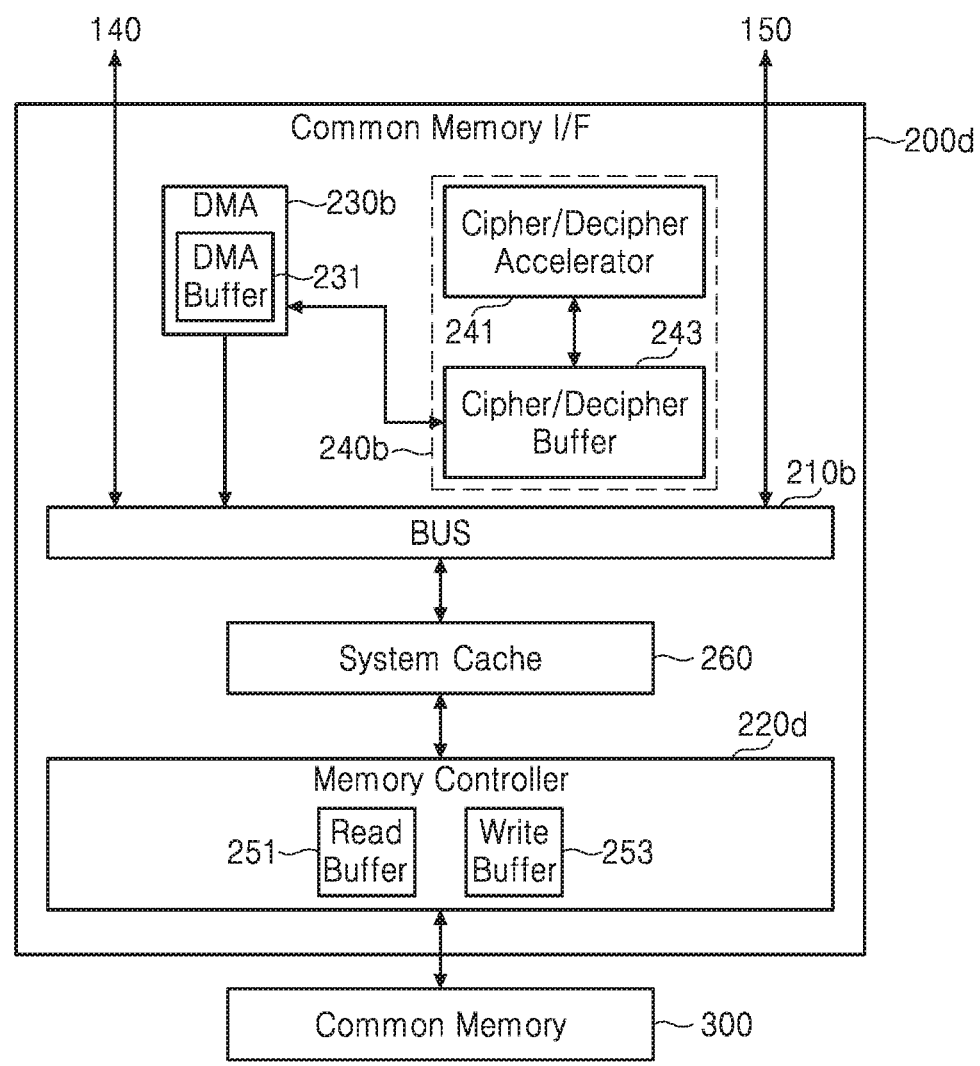
FIG. 6 is a block diagram of a modified example of a memory interface circuit illustrated in FIG. 4.

FIG. 6 is a block diagram of a common memory interface circuit 200*d* which is a modified example of the common memory interface circuit 200*b* illustrated in FIG. 4. Referring to FIGS. 4 and 6, the common memory interface circuit 200*d* is substantially the same as the common memory interface circuit 200*b* of FIG. 4 in terms of their structures and operations, and will be thus described focusing on the differences from the common memory interface circuit 200*b* to avoid redundant description.

The common memory interface circuit 200*d* further includes a system cache 260, compared to the common memory interface circuit 200*b* of FIG. 4.

The system cache 260 is as described above with reference to FIG. 5 and will thus not be described here again.

Figure 7:
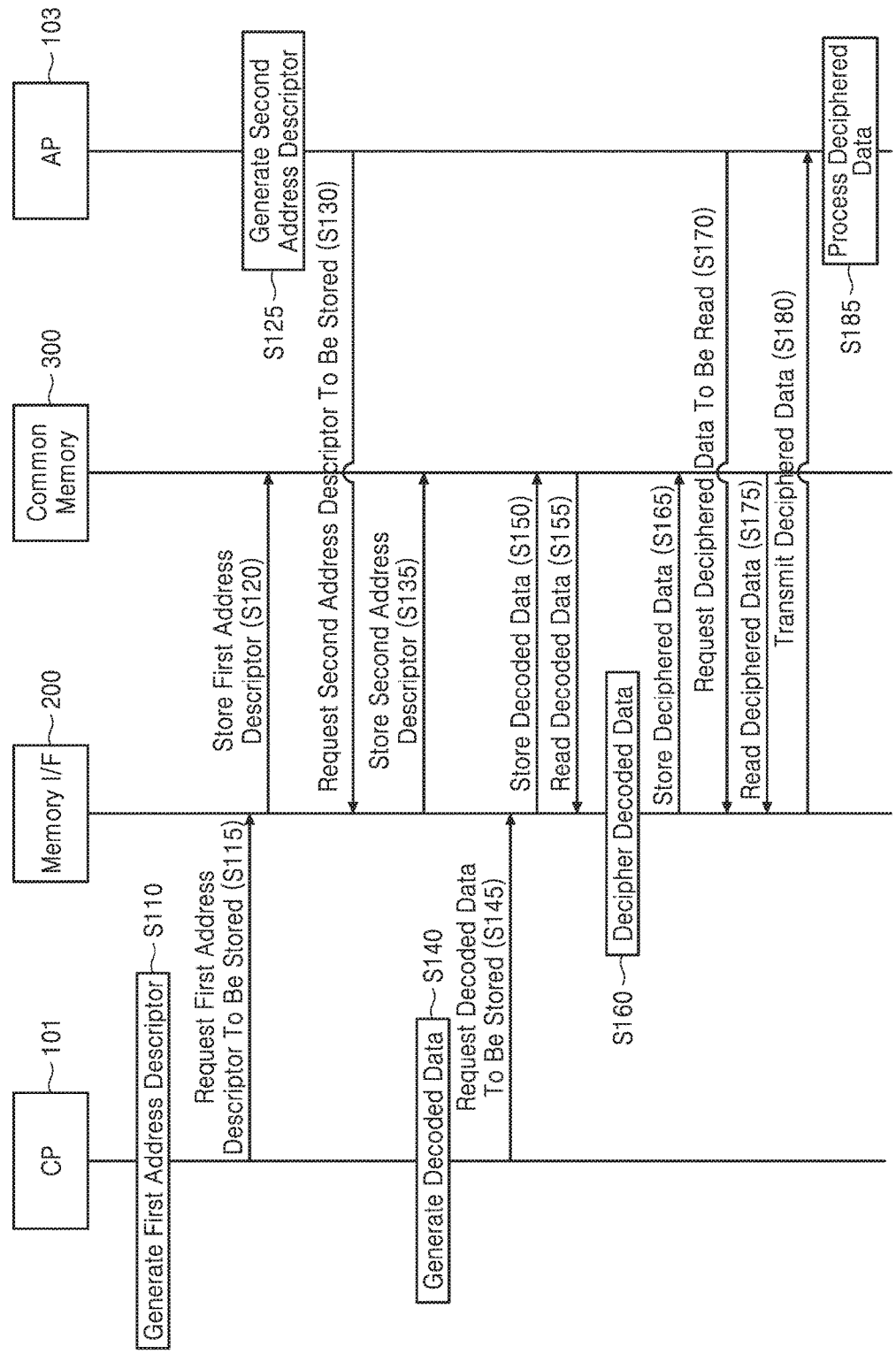
FIG. 7 is a flowchart of a method of operating a multi-processor system according to at least one example embodiment of the inventive concepts.
Figure 8:
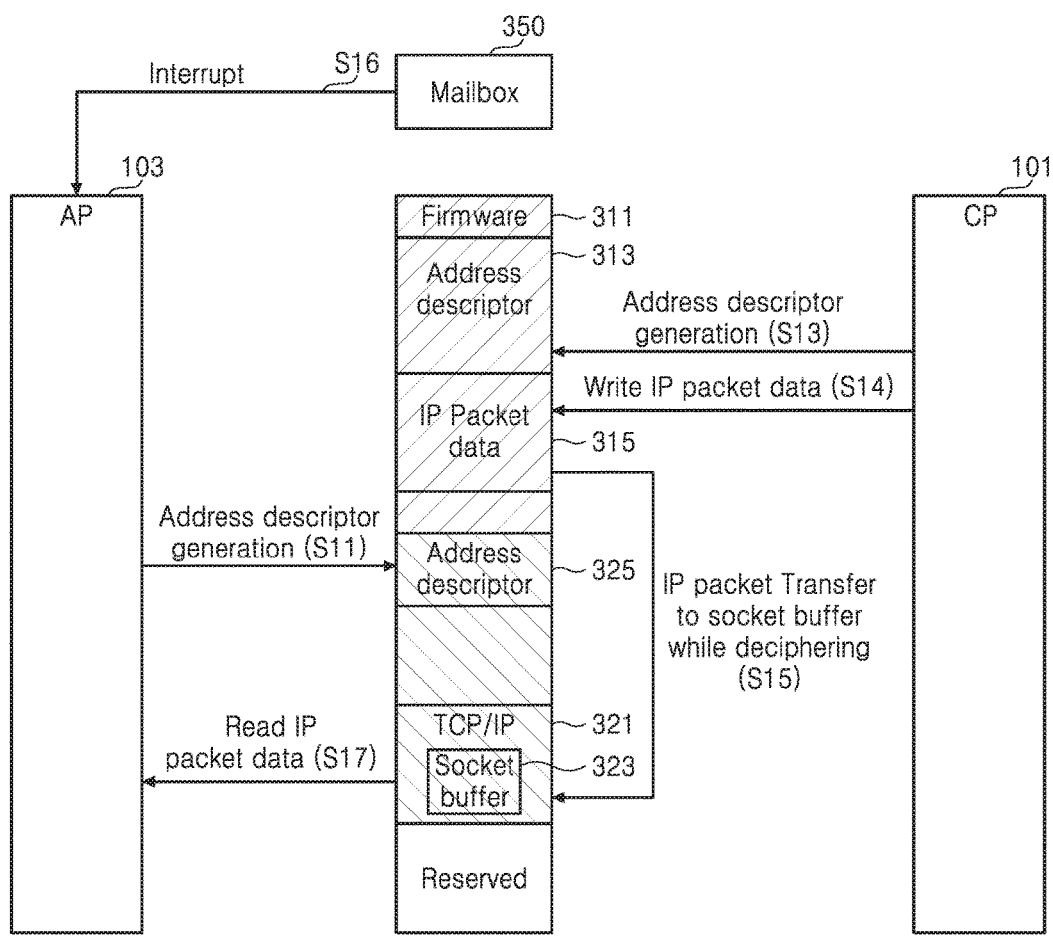
FIG. 8 is a diagram illustrating a method of operating a multi-processor system according to at least one example embodiment of the inventive concepts.

FIG. 7 is a flowchart of a method of operating a multi-processor system according to at least one example embodiment of the inventive concepts. FIG. 8 is a diagram illustrating a method of operating a multi-processor system according to at least one example embodiment of the inventive concepts. In particular, FIGS. 7 and 8 illustrate examples of a method of processing downlink data by a multi-processor system, according to at least some example embodiments of the inventive concepts. The methods of FIGS. 7 and 8 may be performed by the multi-processor system 10, 10*a*, or 10*b* illustrated in FIG. 1, 3, or 4.

First, a connectivity processor, CP 101, may generate a first address descriptor indicating a location at which downlink data is to be stored (operation S110) and store the first address descriptor in a common memory 300 via a common memory interface circuit 200 (operation S115, S120). The CP 101 may correspond to the first processor 110 of FIG. 1 and/or the CP SoC 101 of FIG. 3 or FIG. 4. The first address descriptor may include address information indicating a location in the common memory 300, at which the downlink data (e.g., decoded data) is to be stored.

For example, the CP 101 may generate the first address descriptor (operation S110) and request the common memory interface circuit 200 to store the first address descriptor (operation S115). The common memory interface circuit 200 may store the first address descriptor in the common memory 300 according to the request (operation S120).

In one embodiment, as illustrated in FIG. 8, the first address descriptor may be stored in the address descriptor region 313 of the first-processor allocation region 310 of the common memory 300 (operation S13 of FIG. 8).

Similarly, an application processor, AP 103, may generate a second address descriptor indicating a location at which downlink data is to be stored (operation S125) and store the second address descriptor in the common memory 300 via the common memory interface circuit 200 (operations S130 and S135). The AP 103 may correspond to the second processor 130 of FIG. 1 and/or the AP SoC 103 of FIG. 3 or FIG. 4.

The second address descriptor may include address information indicating a location in the common memory 300, at which the downlink data (e.g., deciphered data) is to be stored.

For example, the AP 103 may generate the second address descriptor (operation S125) and request the common memory interface circuit 200 to store the second address descriptor (operation S130). The common memory interface circuit 200 may store the second address descriptor in the common memory 300 according to the request (operation S135).

In one embodiment, as illustrated in FIG. 8, the second address descriptor may be stored in the address descriptor region 325 of the second-processor allocation region 320 of the common memory 300 (operation S11 of FIG. 8).

The CP 101 receives wireless data through wireless communication, and generates decoded data by modulating and decoding the received wireless data (operation S140). Also, the CP 101 may generate packet data having a pre-determined or, alternatively, desired format (e.g., Internet protocol (IP) packet data) from the decoded data.

The CP 101 may request the common memory interface circuit 200 to store the decoded data by transmitting the decoded data to the common memory interface circuit 200 (operation S145).

For example, the CP 101 may request the common memory interface circuit 200 to store the decoded data (operation S145), and the common memory interface circuit 200 may store the decoded data in the common memory 300 in response to the request (operation S150).

In one embodiment, as illustrated in FIG. 8, the CP 101 may generate IP packet data including decoded data and store the IP packet data in the packet data region 315 of the first-processor allocation region 310 of the common memory 300 (operation S14 of FIG. 8)

The common memory interface circuit 200 reads the IP packet data including the decoded data from the first-processor allocation region 310 of the common memory 300 (operation S155), and deciphers the IP packet data (operation S160). Also, the common memory interface circuit 200 stores the deciphered data in the second-processor allocation region 320 of the common memory 300 (operation S165).

For example, as illustrated in FIG. 8, the common memory interface circuit 200 may store the deciphered data in the socket buffer 323 of the second-processor allocation region 320 by referring to the second address descriptor stored in the address descriptor region 325 of the second-processor allocation region 320 (operation S15 of FIG. 8).

When the deciphered data is stored in the socket buffer 323 of the second-processor allocation region 320, the AP 103 may request the common memory interface circuit 200 to read the deciphered data (operation S170), and the common memory interface circuit 200 may read the deciphered data from the common memory 300 in response to the request (operation S175) and provide the deciphered data to the AP 103 (operation S180). The AP 103 may process the deciphered data and provide the deciphered data to a user (operation S185).

In one embodiment, before operation S15, the AP 103 may generate a socket buffer structure for storing deciphered packet data, and store the socket buffer structure in the TCP/IP data region 321 of the second-processor allocation region 320.

In one embodiment, when the deciphered packet data is stored in the socket buffer 323 of the second-processor allocation region 320, an 'end' signal may be stored in a mailbox 350 of FIG. 8. In this case, the mailbox 350 may generate an interrupt signal to the AP 103 (operation S16 of FIG. 8). The mailbox 350 may be a circuit included in, for example, a common memory interface circuit (e.g., common memory interface circuit 200 and/or 200a-200d).

Then, the, AP 103 may read the deciphered data from the common memory 300 and process the deciphered data, in response to the interrupt signal (operation S17 of FIG. 8).

In one embodiment, the operations included in the method, illustrated in FIGS. 7 and/or 8, of operating a multi-processor system may be performed in an order different from that described above, and at least one among the operations of the method may be performed in parallel.

Figure 9:
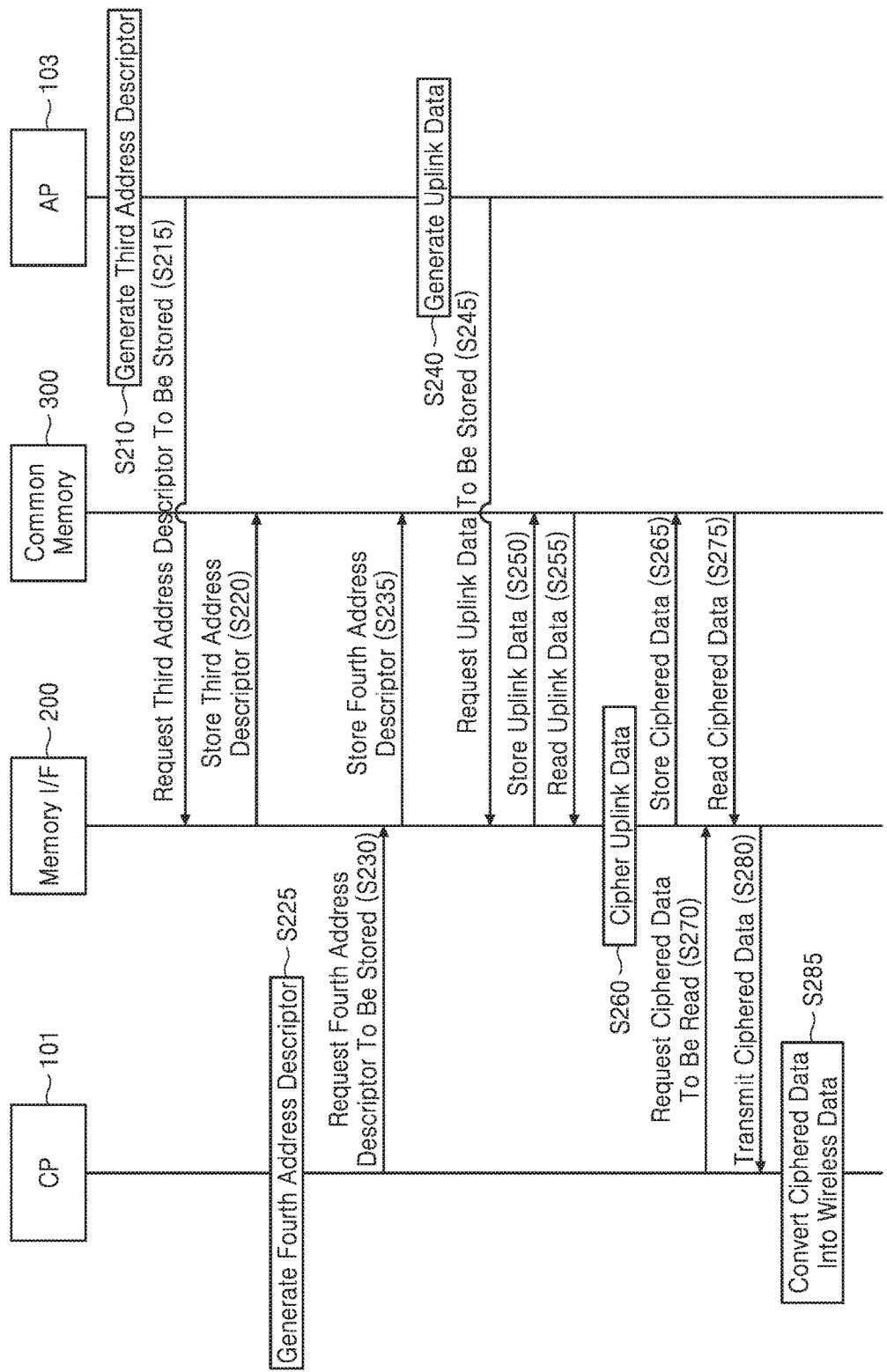
FIG. 9 is a flowchart of a method of operating a multi-processor system according to at least another example embodiment of the inventive concepts.
Figure 10:
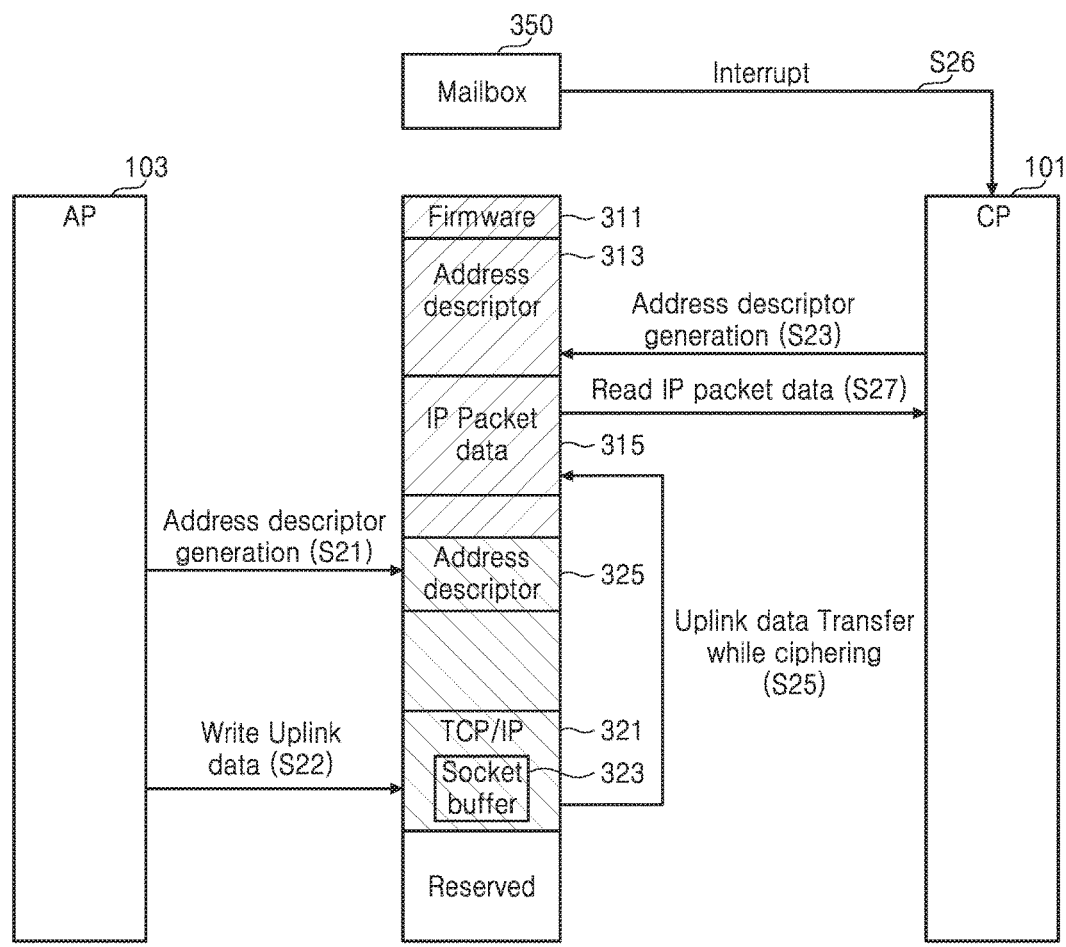
FIG. 10 is a diagram illustrating a method of operating a multi-processor system according to at least another example embodiment of the inventive concepts.

FIG. 9 is a flowchart of a method of operating a multi-processor system according to at least another example embodiment of the inventive concepts. FIG. 10 is a diagram illustrating a method of operating a multi-processor system according to at least another example embodiment of the inventive concepts. In particular, FIGS. 9 and 10 illustrate examples of a method of processing uplink data by a multi-processor system, according to at least some example embodiments of the inventive concepts. The methods of FIGS. 9 and 10 may be performed by the multi-processor system 10, 10a, or 10b of FIG. 1, 3, or 4.

First, an application processor, AP 103, may generate a third address descriptor indicating a location at which uplink data is to be stored (operation S210), and store the third address descriptor in a common memory 300 via a common memory interface circuit 200 (operations S215 and S220). The AP 103 may correspond to the second processor 130 of FIG. 1 or the AP SoC 103 of FIG. 3 or 4. The third address descriptor may include address information indicating a location in the common memory 300, at which the uplink data (e.g., packet data generated by the AP 103) is to be stored.

For example, the AP 103 may generate the third address descriptor (operation S210) and request the common memory interface circuit 200 to store the third address descriptor (operation S215), and the common memory interface circuit 200 may store the third address descriptor in the common memory 300 in response to the request (operation S220).

In one embodiment, as illustrated in FIG. 10, the third address descriptor may be stored in the address descriptor region 325 of the second-processor allocation region 320 of the common memory 300 (operation S21 of FIG. 10).

Similarly, a connection processor, CP 101, may generate a fourth address descriptor indicating a location at which uplink data is to be stored (operation S225), and store the fourth address descriptor in the common memory 300 via the common memory interface circuit 200 (operations S230 and S235). The CP 101 may correspond to the first processor 110 of FIG. 1 or the CP SoC 101 of FIG. 3 or 4.

The fourth address descriptor may include address information indicating a location in the common memory 300, at which the uplink data is to be stored.

For example, the CP 101 may generate the fourth address descriptor (operation S225) and request the common memory interface circuit 200 to store the fourth address descriptor (operation S230), and the common memory interface circuit 200 may store the fourth address descriptor in the common memory 300 in response to the request (operation S235).

In one embodiment, as illustrated in FIG. 10, the fourth address descriptor may be stored in the address descriptor region 313 of the first-processor allocation region 310 of the common memory 300 (operation S23 of FIG. 10).

The AP 103 generates uplink data to be transmitted through wireless communication (operation S240). Also, the AP 103 may generate packet data having a predetermined or, alternatively, desired format and including the uplink data (e.g., IP packet data).

The AP 103 may request the common memory interface circuit 200 to store the uplink data by transmitting the uplink data to the common memory interface circuit 200 (operation S245).

For example, the AP 103 may request the common memory interface circuit 200 to store the uplink data (operation S245), and the common memory interface circuit 200 may store the uplink data in the common memory 300 in response to the request (operation S250).

In one embodiment, as illustrated in FIG. 10, the AP 103 may generate IP packet data including the uplink data and store the IP packet data in the socket buffer 323 of the TCP/IP data region 321 of the second-processor allocation region 320 of the common memory 300 (operation S22 of FIG. 10).

In one embodiment, before operation S22, the AP 103 may generate a socket buffer structure for storing uplink packet data, and store the socket buffer structure in the TCP/IP data region 321 of the second-processor allocation region 320.

The common memory interface circuit 200 reads the uplink data from the socket buffer 323 of the second-processor allocation region 320 of the common memory 300 (operation S255), and ciphers the uplink data (operation S260).

Also, the common memory interface circuit 200 stores the ciphered data in the first-processor allocation region 310 of the common memory 300 (operation S265).

For example, as illustrated in FIG. 10, the common memory interface circuit 200 may store the ciphered uplink data in the packet data region 315 of the first-processor allocation region 310 by referring to the fourth address descriptor stored in the address descriptor region 313 of the first-processor allocation region 310 (operation S25 of FIG. 10).

When the ciphered uplink data is stored in the packet data region 315 of the first-processor allocation region 310, the CP 101 may request the common memory interface circuit 200 to read the ciphered uplink data (operation S270), and the common memory interface circuit 200 may read the ciphered uplink data from the common memory 300 (operation S275) and provide the ciphered uplink data to the CP 101, in response to the request (operation S280). The CP 101 may convert the ciphered uplink data into wireless data, which is to be transmitted through wireless communication, by encoding and modulating the ciphered uplink data (operation S285).

In one embodiment, when the ciphered uplink data is stored in the packet data region 315 of the first-processor allocation region 310, an 'end' signal may be stored in a mailbox 350 of FIG. 10. In this case, the mailbox 350 may generate an interrupt signal to the CP 101 (operation S26 of FIG. 10).

Then the CP 101 may read the ciphered uplink data from the common memory 300 and convert the ciphered uplink data into wireless data, in response to the interrupt signal (operation S27 of FIG. 10).

Figure 11:
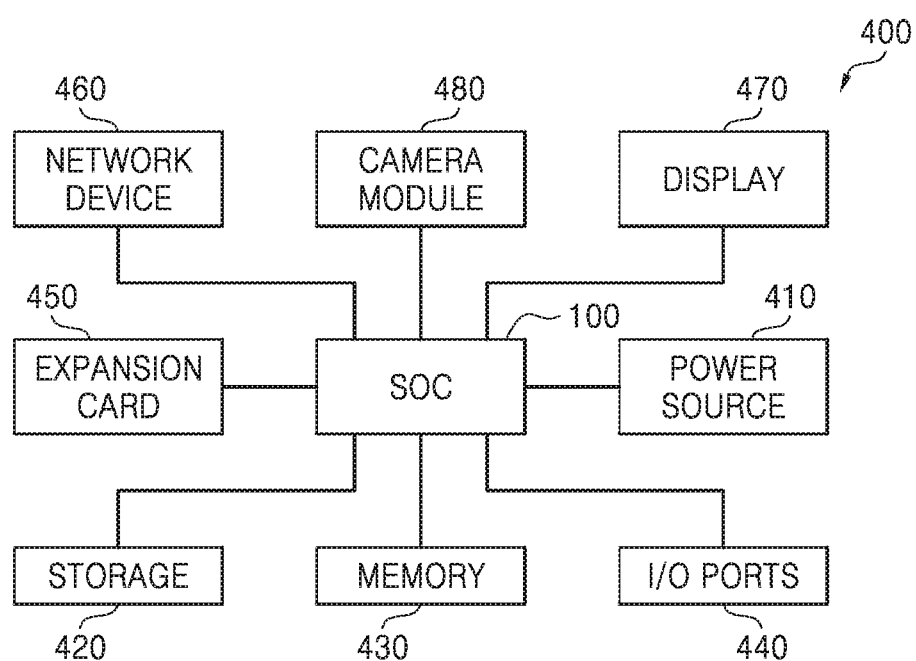
FIG. 11 is a block diagram of an electronic system according to at least one example embodiment of the inventive concepts.

FIG. 11 is a block diagram of an electronic system 400 according to at least one example embodiment of the inventive concepts.

Referring to FIG. 11, the electronic system 400 may be embodied as personal computer (PC), a data server, a laptop computer, or a portable device. The portable device may be a mobile phone, a smart phone, a tablet PC, a personal digital assistant (PDA), an enterprise digital assistant (EDA), a digital still camera, a digital video camera, a portable multimedia player (PMP), a personal navigation device or a portable navigation device (PDN), a handheld game console, or an e-book.

The electronic system 400 includes a SoC 100, a power source 410, a storage device 420, a memory 300, input/output (I/O) ports 440, an expansion card 450, a network device 460, and a display 470. In one embodiment, the electronic system 400 may further include a camera module 480.

The SoC 100 may control an operation of at least one among these elements 410 to 480. The SoC 100 corresponds to the SoC 100, 100a, or 100b illustrated in FIG. 1, 3, or 4.

The power source 410 may supply an operating voltage to at least one among these elements 100 and 420 to 480.

The storage device 420 may be embodied as a hard disk drive or a solid state drive (SSD).

The memory 300 may be embodied as a volatile memory or a nonvolatile memory.

The I/O ports 440 are ports configured to transmit data to the electronic system 400 or transmit data output from the electronic system 400 to an external device. For example, the I/O ports 440 may include a port configured to connect a pointing device such as a computer mouse to the electronic device 400, a port configured to connect a printer to the electronic device 400, a port configured to connect a universal serial bus (USB) drive to the electronic device 400, etc.

The expansion card 450 may be embodied as a secure digital (SD) card or a multimedia card (MMC). In one embodiment, the expansion card 450 may be a subscriber identification nodule (SIM) card or a universal subscriber identity module (USIM) card.

The network device 460 is a device configured to connect the electronic system 400 to a wired or wireless network.

The display 470 may display data output from the storage device 420, the memory 300, the I/O ports 440, the expansion card 450, or the network device 460.

The camera module 480 is a module (e.g., a module which may include at least one lens and at least one image sensor) configured to convert an optical image into an electrical image. Thus, the electrical image output from the camera module 480 may be stored in the storage device 420, the memory 300, or the expansion card 450. Also, the electrical image output from the camera module 480 may be displayed on the display 420.

Figure 12:
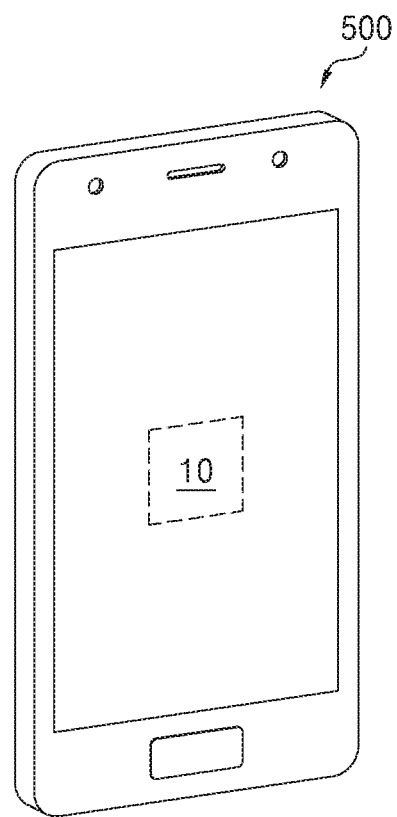
FIG. 12 is a schematic diagram illustrating a mobile device according to at least one example embodiment of the inventive concepts.

FIG. 12 is a schematic diagram illustrating a mobile device 500 according to at least one example embodiment of the inventive concepts. Referring to FIG. 12, the mobile device 500 may include the multi-processor system 10 of FIG. 1.

The mobile device 500 may be embodied as, but is not limited to, a smart phone, a tablet PC, a personal digital assistant (PDA), an enterprise digital assistant (EDA), a mobile internet device (MID), or the like.

According to at least one example embodiment of the inventive concepts, in a system in which two or more processors share one memory, a local DMA unit and a cipher and decipher module are included in a memory interface circuit. Thus, when data is transmitted from one processor to another processor, the data may be internally transmitted only via the memory interface circuit without passing through buses of the processors. Thus, when data is exchanged between processors, a number of times of accessing a common memory may be decreased. Accordingly, the performance (e.g., the operating speed, etc.) of a multi-processor system may be improved and power consumption thereof may be decreased.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A multi-processor system comprising:
    a first processor;
    a second processor; and
    a memory interface circuit,
    the second processor being configured to generate a second address descriptor, and request the memory interface circuit to store the second address descriptor in common memory, the second address descriptor including address information indicating a location in the common memory at which deciphered data is to be stored,
    the memory interface circuit being configured to store the second address descriptor in the common memory according to the request of storing the second address descriptor from the second processor,
    the first processor being configured to generate decoded data by demodulating and decoding a signal received through wireless communication, and request the memory interface circuit to store the decoded data in a common memory,
    the memory interface circuit being further configured to,
        in response to the request of storing the decoded data from the first processor, store the decoded data generated by the first processor in the common memory,
        read the decoded data stored in the common memory,
        generate the deciphered data by deciphering the decoded data read from the common memory, and
        store the deciphered data generated by the memory interface circuit in the common memory based on the second address descriptor stored in the common memory.

2. The multi-processor system of claim 1, wherein the memory interface circuit comprises:
    a cipher and decipher module configured to generate the deciphered data by deciphering the decoded data, and
    a local DMA unit configured to read the decoded data in the common memory and provide the decoded data to the cipher and decipher module, according to a request from the cipher and decipher module.

3. The multi-processor system of claim 2, wherein the first processor is further configured to generate a first address descriptor, and request the memory interface circuit to store the first address descriptor in common memory, the first address descriptor including address information of the decoded data, and
    wherein the memory interface circuit is further configured to store the first address descriptor in the common memory according to the request of storing the first address descriptor from the first processor.

4. The multi-processor system of claim 3, the local DMA unit configured to read the decoded data in the common memory by referring to the first address descriptor.

5. The multi-processor system of claim 2, the local DMA unit configured to store the deciphered data in the common memory by referring the second address descriptor.

6. The multi-processor system of claim 1, the memory interface circuit being further configured to,
    in response a request from the second processor, read the deciphered data stored in the common memory, and
    provide the deciphered data read from the common memory to the second processor.

7. The multi-processor system of claim 1, wherein the memory interface circuit further comprises a mailbox configured to generate and provide an interrupt signal to the second processor, after the deciphered data is stored in the common memory.

8. The multi-processor system of claim 7, wherein the second processor is further configured to read the deciphered data from the common memory and process the deciphered data, in response to the interrupt signal.

9. The multi-processor system of claim 1, wherein the memory interface circuit further comprises a system cache configured to store cache data corresponding to data stored in the common memory, and
    wherein the memory interface circuit is further configured to check whether the cache data has been stored in the system cache before reading data from the common memory.

10. A multi-processor system comprising:
    a first processor;
    a second processor; and
    a memory interface circuit,
    the first processor being configured to generate a fourth address descriptor, and request the memory interface circuit to store the fourth address descriptor in common memory, the fourth address descriptor including address information indicating a location in the common memory at which ciphered data is to be stored,
    the memory interface circuit being further configured to store the fourth address descriptor in the common memory according to the request of storing the fourth address descriptor from the first processor,
    the second processor being configured to generate uplink data for wireless communication and request the memory interface circuit to store the uplink data a common memory,
    the memory interface circuit being configured to,
        in response to the request of the second processor, store the uplink data generated by the second processor in the common memory,
        read the uplink data stored in the common memory,
        generate the ciphered data by ciphering the uplink data read from the common memory, and
        store the ciphered data generated by the memory interface circuit in the common memory based on the fourth address descriptor stored in the common memory.

11. The multi-processor system of claim 10, wherein the memory interface circuit comprises:
    a cipher and decipher module configured to generate the ciphered data by ciphering the uplink data, and
    a local DMA unit configured to read the uplink data in the common memory and provide the uplink data to the cipher and decipher module, according to a request from the cipher and decipher module.

12. The multi-processor system of claim 11, wherein the second processor is further configured to generate a third address descriptor, and request the memory interface circuit to store the third address descriptor in common memory, the third address descriptor including address information of the uplink data, and wherein the memory interface circuit is further configured to store the third address descriptor in the common memory according to the request of storing the third address descriptor from the second processor.

13. The multi-processor system of claim 12, the local DMA unit configured to read the uplink data in the common memory by referring to the third address descriptor.

14. The multi-processor system of claim 11, the local DMA unit configured to store the ciphered data in the common memory by referring to the fourth address descriptor.

15. The multi-processor system of claim 10, the memory interface circuit being further configured to, in response a request from the first processor, read the ciphered data stored in the common memory, and provide the ciphered data read from the common memory to the first processor.

16. The multi-processor system of claim 10, wherein the memory interface circuit further comprises a mailbox configured to generate and provide an interrupt signal to the first processor, after the ciphered data is stored in the common memory.

17. The multi-processor system of claim 16, wherein the first processor is further configured to read the ciphered data from the common memory and convert the ciphered data into wireless data, in response to the interrupt signal.

18. The multi-processor system of claim 10, wherein the memory interface circuit further comprises a system cache configured to store cache data corresponding to data stored in the common memory, and wherein the memory interface circuit is further configured to check whether the cache data has been stored in the system cache before reading data from the common memory.

* * * * *